W. M. LINDLEY.
ANTIKICKING SAFETY ATTACHMENT FOR INTERNAL COMBUSTION ENGINES.
APPLICATION FILED MAR. 13, 1916.
1,205,364.
Patented Nov. 21, 1916.
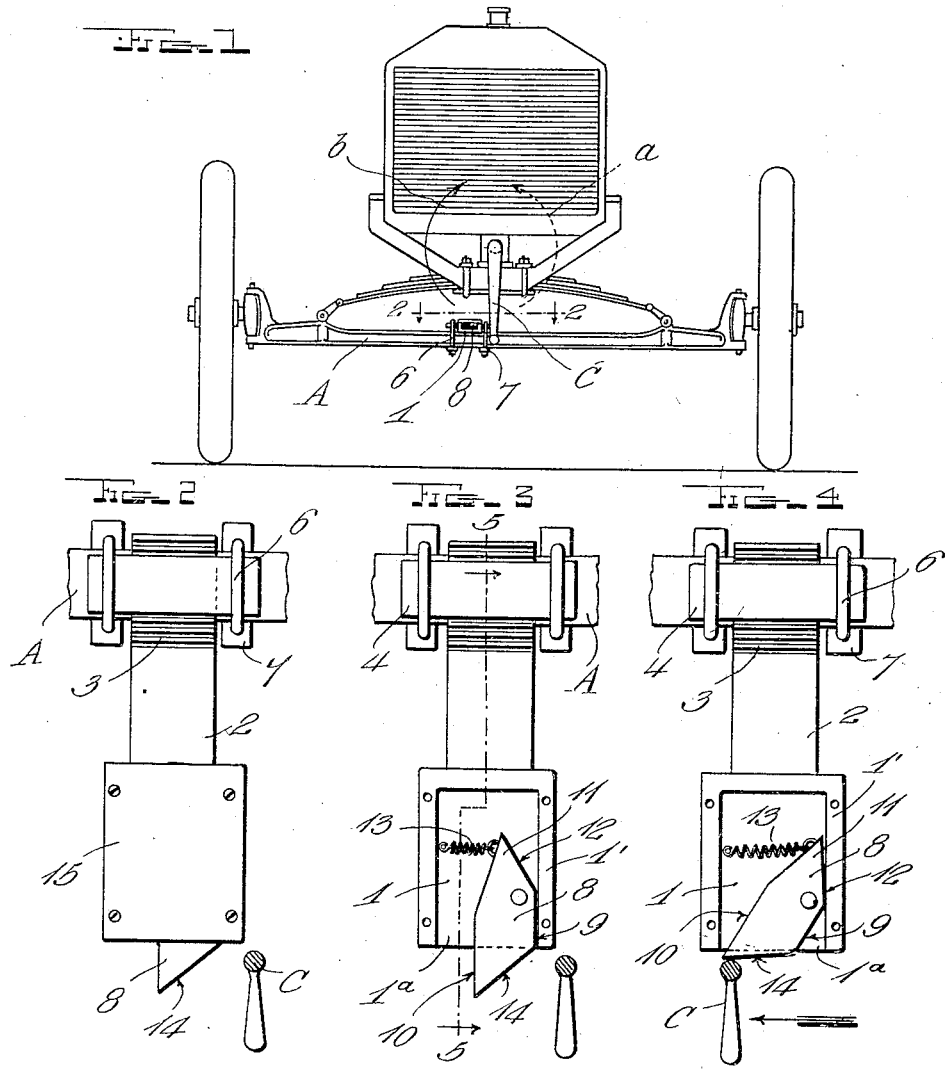
Inventor
W. M. Lindley
By H. B. Willson & Co.
Attorneys
Witness

UNITED STATES PATENT OFFICE.

WILLIAM M. LINDLEY, OF LAWRENCE, KANSAS.

ANTIKICKING SAFETY ATTACHMENT FOR INTERNAL-COMBUSTION ENGINES.

1,205,364. Specification of Letters Patent. Patented Nov. 21, 1916.

Application filed March 13, 1916. Serial No. 83,920.

*To all whom it may concern:*

Be it known that I, WILLIAM M. LINDLEY, a citizen of the United States, residing at Lawrence, in the county of Douglas and State of Kansas, have invented certain new and useful Improvements in Antikicking Safety Attachments for Internal-Combustion Engines; and I do declare the following to be a full, clear, and exact description of the invention, such as will enable others skilled in the art to which it appertains to make and use the same.

This invention relates to improvements in an anti-kicking safety attachment for automobile and other internal combustion engines.

The object of the invention is to provide a simply constructed and efficient device of this character which may be easily and quickly applied to any motor vehicle having a crank for starting it, without marring or defacing the vehicle or any of the parts thereof.

With this and other objects in view, the invention resides in certain novel features of construction, and the combination and arrangement of parts which will hereinafter be more particularly described and claimed.

In the accompanying drawings: Figure 1 represents a front view of a portion of a motor vehicle equipped with this improved attachment; Fig. 2 is a plan view of the attachment showing it attached to a portion of a vehicle axle, and with the dog in projected position; Fig. 3 is a similar view with the cover of the casing removed, showing the dog in projected position, before it is engaged by the crank; Fig. 4 is a similar view showing the dog retracted with the crank just passing it; and Fig. 5 is a longitudinal section taken on the line 5—5 of Fig. 3.

In the embodiment illustrated, the attachment constituting this invention comprises a housing or casing 1 having an integral shank 2, said shank being provided on its upper face with serrations 3 to provide for its adjustable and rigid connection with the axle A of the vehicle to which it is to be applied. A clamping plate 4 having coöperating serrations 5 on one face thereof is designed to fit over the serrated face of the shank 2 and be rigidly connected therewith by suitable clips 6 held in place by nuts 7 so that when it is desired to adjust the device relative to the axle on which it is mounted to position it in proper relation to the crank with which it is to be used, all that is necessary is to loosen the nuts 7 and lift the plate 4 to provide for the longitudinal movement of the shank 2 in the desired direction, and after it has been properly adjusted, the plate 4 is again replaced and clamped in engagement therewith by tightening the nuts 7.

The casing 1 is shown rectangular in form, being closed throughout except for an opening 1ª in one end thereof, and is designed to house a crank engaging stop 8 in the form of a pivotally mounted pentagonal dog having two parallel side edges 9 and 10, one of which is designed to engage one of the side walls of the casing 1 when the dog is in projected locking position as shown in Figs. 2 and 3 and the other to extend laterally out from the open end of the casing in a plane at right angles to said end and is designed to engage the crank C when swung in reverse direction such as may be caused by the back-firing of the engine and which would be in the direction of the arrow *a*. The inner end of this dog 8 has its edges converging to form a triangular point 11, one inclined edge 12 of said end being designed to engage the side wall 1' of the casing 1 when the dog is swung into retracted position by the passing crank when turned in the direction of the arrow *b*, said side wall serving to limit the inward or retracting movement of said dog as is shown clearly in Fig. 4 of the drawing. A coiled spring 13 is attached at one end to the casing 1 and at its other end to the dog 8, preferably at the pointed inner end thereof and exerts its tension to normally turn said dog into projected position as shown in Fig. 3 ready for engagement by the crank in the path of which the dog is located when in projected position.

The outer or projecting end of the dog is inclined outwardly and forwardly from the side edge 9 of said dog toward the edge 10 thereof to present an inclined face 14 which is normally positioned in the path of the operating crank of the engine so that when said crank is turned in the direction of the arrow *b* for starting the engine, it will on engaging the obliquely inclined face 14 of said dog, force the dog inwardly against the tension of the spring 13 without its offering any appreciable resistance to the operation of the crank. Immediately the crank passes the dog, the spring 13 will return it to its normal projected position with its side edge 9 engaged with the inner face of the side wall 1′ of the casing 1 which serves to lock said dog against its lateral movement in that direction so that when the turning of the crank C is reversed to the path of its normal direction, or in the direction of the arrow $a$, it will contact with the projecting edge 10 of said dog and be prevented from further movement, thereby avoiding all possibility of injuring the operator, such as would be likely to occur if the crank were to be allowed to continue in its rearward direction. The casing 1 is provided with a removable cover 15 to afford access to the interior thereof when necessary and which serves to protect the dog and its controlling spring against dust and the like.

From the above description, it will be obvious that this improved attachment may be easily and quickly applied to the axle of any motor vehicle without in any way marring or injuring the axle or weakening it, and when applied as shown in Fig. 1, the projectable and retractable dog 8 thereof will be normally positioned in the path of the crank C with the inclined face 14 of said dog arranged for engagement by the passing crank when turned in the direction of the arrow $b$ which is the normal direction of turning when cranking the engine and with the right angularly projecting edge 10 of said dog positioned to engage the crank when turned in the reverse direction so that the crank will be locked when it is so reversed and hence all possibility of its injuring the operator will be avoided.

I claim as my invention:

1. An anti-kicking safety attachment for internal combustion engines comprising a supporting member having means for connecting it to a supporting structure, a stop carried by said member adapted to be positioned to normally project into the path of the crank of an engine, said stop being yieldable to move out of the path of the crank on the engagement thereof by the crank when turned in one direction and to be locked against movement when engaged by the crank on the turning of said crank in the opposite direction.

2. An anti-kicking safety attachment for motor vehicles comprising a supporting structure including a casing open at one end, a pentagonal dog pivotally mounted in said casing and having two parallel side edges, one of which is designed to engage one of the walls of the casing on the movement of the dog in one direction, and an obliquely disposed edge for engaging said wall on the movement of the dog in the opposite direction and designed to form a stop for limiting the inner movement of the dog, the first mentioned side edge forming locking means for the dog.

3. In an anti-kicking device of the class described, the combination of a support having attaching means, a lateral stop on said support, a member pivotally mounted on said support and adapted to be positioned for engagement by an engine crank, said member having adjacent edges arranged at an angle to each other, one of which is positioned to engage said stop and lock said member against turning when pressure is exerted thereon in one direction and to clear said stop and permit the member to turn a predetermined distance when pressure is exerted thereon in the opposite direction, the other angular edge engaging said stop and limiting the turning movement of said member in said last mentioned direction, and means for returning said member to normal locked position.

4. In an anti-kicking device of the class described, the combination of a support having attaching means, a lateral stop on said support, a dog pivotally mounted on said support adjacent said stop, one of the edges of said dog being substantially parallel with said stop when in normal position and arranged for locking engagement therewith, one end of said dog projecting normally beyond said support and adapted to be positioned in the path of the crank of the engine with which the device is used, the projecting end of said dog having one edge inclined and the other disposed at an acute angle to said inclined edge whereby the engine crank will engage the inclined edge and ride freely thereover when moved in one direction and engage the other edge of the projecting end when moved in the opposite direction and force said dog against said stop and be locked by it against continued movement in said direction.

In testimony whereof I have hereunto set my hand in presence of two subscribing witnesses.

WILLIAM M. LINDLEY.

Witnesses:
WM. A. EUDALY,
LORA M. EUDALY.

Copies of this patent may be obtained for five cents each, by addressing the "Commissioner of Patents, Washington, D. C."